United States Patent
Eckert et al.

(10) Patent No.: US 10,119,213 B2
(45) Date of Patent: Nov. 6, 2018

(54) BINDER-CONSOLIDATED TEXTILE FABRIC, METHOD FOR PRODUCING IT, AND USE THEREOF

(71) Applicant: JOHNS MANVILLE, Denver, CO (US)

(72) Inventors: Bernhard Eckert, Freudenberg-Boxtal (DE); Ignacio Nuñez, Alzenau (DE)

(73) Assignee: Johns Manville, Denver, CO (US)

(*) Notice: Subject to any disclaimer, the term of this patent is extended or adjusted under 35 U.S.C. 154(b) by 150 days.

(21) Appl. No.: 14/825,225

(22) Filed: Aug. 13, 2015

(65) Prior Publication Data

US 2016/0053418 A1 Feb. 25, 2016

(51) Int. Cl.
| | | |
|---|---|---|
| *D04H 1/587* | (2012.01) | |
| *C08L 33/08* | (2006.01) | |
| *C08L 3/02* | (2006.01) | |
| *C09D 133/08* | (2006.01) | |
| *C09D 103/02* | (2006.01) | |
| *C09J 133/02* | (2006.01) | |
| *C09J 125/08* | (2006.01) | |
| *C09J 135/00* | (2006.01) | |
| *C09J 103/02* | (2006.01) | |

(52) U.S. Cl.
CPC ............... *D04H 1/587* (2013.01); *C08L 3/02* (2013.01); *C08L 33/08* (2013.01); *C09D 103/02* (2013.01); *C09D 133/08* (2013.01); *C09J 103/02* (2013.01); *C09J 125/08* (2013.01); *C09J 133/02* (2013.01); *C09J 135/00* (2013.01); *D10B 2101/06* (2013.01); *D10B 2503/04* (2013.01); *D10B 2503/041* (2013.01); *D10B 2505/20* (2013.01)

(58) Field of Classification Search
CPC ........... D04H 1/587; C08L 33/08; C08L 3/02; C09D 133/08; C09D 103/02; C09J 125/08; C09J 135/00; C09J 133/02; C09J 103/02; D10B 2505/20; D10B 2503/04; D10B 2101/06; D10B 2503/041
See application file for complete search history.

(56) References Cited

U.S. PATENT DOCUMENTS

| | | | |
|---|---|---|---|
| 2009/0170978 A1 | 7/2009 | Kelly | |
| 2010/0098947 A1* | 4/2010 | Inoue ...................... | C08L 33/04 428/375 |
| 2011/0021101 A1* | 1/2011 | Hawkins ............. | C03C 25/1095 442/327 |
| 2012/0315458 A1* | 12/2012 | Zheng ...................... | B32B 5/02 428/292.1 |
| 2013/0150521 A1* | 6/2013 | Matsuo ................. | C03C 25/285 524/556 |
| 2013/0157030 A1* | 6/2013 | Frick ......................... | C08L 3/02 428/219 |
| 2015/0203667 A1* | 7/2015 | Netravali .............. | C08B 31/003 106/162.9 |
| 2015/0321958 A1* | 11/2015 | Castro-Cabado ...... | C09J 103/02 252/62 |

FOREIGN PATENT DOCUMENTS

| | | | | |
|---|---|---|---|---|
| DE | 698 22 957 T2 | 8/2004 | | |
| EP | 2 192 153 A2 | 6/2010 | | |
| EP | 2 199 333 A1 | 6/2010 | | |
| EP | 2 607 533 A2 | 6/2013 | | |
| EP | 2 679 624 A1 | 1/2014 | | |
| WO | 2012 136605 A1 | 10/2012 | | |
| WO | WO-2014001518 A1 * | 1/2014 | ............ | C09J 103/02 |

* cited by examiner

*Primary Examiner* — Nathan L Van Sell
(74) *Attorney, Agent, or Firm* — Robert D. Touslee

(57) ABSTRACT

The invention relates to a novel binder system and its use for bonding textile fabrics as well as products containing such bonded textile fabrics. The materials according to the invention are suitable for the manufacture of base interlinings, optionally in combination with at least one further textile fabric, for coated sarking membranes, roofing sheets and water-proof sheetings, as a textile backing or a textile reinforcement in floorings, in particular in carpets and PVC floorings, or in facer, wall coating inside and outside of buildings as well as in furniture.

20 Claims, No Drawings

BINDER-CONSOLIDATED TEXTILE FABRIC, METHOD FOR PRODUCING IT, AND USE THEREOF

BACKGROUND OF THE INVENTION

The invention relates to novel binder systems for consolidating textile fabrics, textile fabrics consolidated therewith, their manufacture as well as products containing the binder system or a textile surface fitted therewith.

Textile fabrics, in particular those which are used as lining material for the manufacture of coated materials, have to meet various requirements. Examples of the use of such lining materials are, among others, textile backings for carpets, textile reinforcements in PVC floorings or roofing sheets.

DETAILED DESCRIPTION OF THE INVENTION

For use in the manufacture of roofing sheets, the used lining materials resp. base interlinings must have a sufficient mechanical stability, such as good perforation strength and good tensile strength, which appear, for example, during further processing, such as bituminization or laying. In addition, there is a need for high resistance to thermal stress, for example during bituminization, or to radiant heat and spreading fire.

For use in the manufacture of coated floorings, such as PVC floorings, additional demands are made on such lining materials. In this field of application, said lining materials not only have to meet the mechanical/thermal requirements but they have to avoid the formation of gaseous substances, since otherwise blistering can be observed during manufacture, for example by the formation of water vapor. Such blistering is very problematic and leads to yield loss and/or poor quality.

For use in the manufacture of surfaces inside and outside of buildings, additional demands are made on such lining materials. In this field of application, said lining materials must, in addition to meeting the mechanical/thermal requirements, also have decorative properties, which remain unchanged or almost unchanged over a longer time period.

In addition to the aforementioned technical requirements, the environmental compatibility and/or new legal regulations account for the need to replace existing, to partly already well-functioning systems by new compliant systems. Examples thereof are new industrial standards, such as the DIN EN 14041, or legal changes, such as the REACH regulation.

The binder systems used so far for consolidating textile fabrics are based on thermoplastic and/or thermosetting binder systems. Examples thereof are aminoplasts and binders based on acrylates.

Binder systems based on polycarboxylates and starch are known from EP-A-2192153. Further binder systems based on polyvinyl acetate and starch are known from EP-A-2607533. The binder systems described are already very well suited for the production and consolidation of textile fabrics and have a good hot strength. For some applications, the wet strength and color stability must, however, be improved. In addition, reducing the binder costs is an important goal of binder development.

There is hence a great need to provide novel binder systems for consolidating textile fabrics to be used as inserts which, on the one hand, meet the technical requirements and the legal regulations and, on the other hand, are available under economic aspects and have an improved color stability over a longer period of time.

It was therefore the object of the present invention to provide novel binder systems for consolidating textile fabrics which, on the one hand, meet the technical requirements and the legal regulations and, on the other hand, are available under economic aspects and have an improved color stability over a longer period of time. Another object is the processability of the binder systems by means of the known and established procedures so that investments can be kept at a low level.

The subject matter of the present invention is thus a textile fabric which is consolidated by means of a binder system comprising:
a) 5 to 70% by weight of polymerisates based on carboxylic acid, which are not cross-linked by means of a low-molecular cross-linking agent, and
b) 95 to 30% by weight of a starch or a mixture of a plurality of starches and
c) 0 to 10% by weight of a catalyst,
d) 0 to 1% by weight of an adhesion promoter,
e) 0 to 10% by weight of additives,
wherein the specified percentages by weight refer to the dry mass of the binder system, i.e., without water and the sum of the constituents a) to e) is equal to 100% by weight.

Low-molecular cross-linking agents are meant to be di-, tri- or poly-functional group, which react with the carboxylic acid groups of the polymerisate and generate a covalent chemical bond, such as compounds with OH groups, in particular polyols, as well as compounds with amine groups, in particular polyamines, as well as compounds with OH— and amine groups, in particular polyalkanolamines, wherein the term "low-molecular" comprises compounds, the molecular weight of which is <1000 g/mol, preferably <500 g/mol.

Another object of the present invention is the binder system used according to the invention, comprising:
a) 5 to 70% by weight of polymerisates based on carboxylic acid, which have no low-molecular cross-linking agent, and
b) 95 to 30% by weight of a starch or a mixture of a plurality of starches and
c) 0 to 10% by weight of a catalyst,
d) 0 to 1% by weight of an adhesion promoter,
e) 0 to 10% by weight of additives,
wherein the specified percentages by weight refer to the dry mass of the binder system, i.e., without water and the sum of the constituents a) to e) is equal to 100% by weight.

Low-molecular cross-linking agents are meant to be di-, tri- or poly-functional group, which react with the carboxylic acid groups of the polymerisate and generate a covalent chemical bond, such as compounds with OH groups, in particular polyols, as well as compounds with amine groups, in particular polyamines, as well as compounds with OH— and amine groups, in particular polyalkanolamines, wherein the term "low-molecular" comprises compounds, the molecular weight of which is <1000 g/mol, preferably <500 g/mol.

In a preferred embodiment of the present invention, the proportion of the component a) (polymerisate based on carboxylic acid) is at least 10% by weight, in particular at least 15% by weight.

In a preferred embodiment of the present invention, the proportion of the component b) (starch) is at least 35% by weight, in particular at least 50% by weight.

In another preferred embodiment, the sum of the components a) and b) is at least 80% by weight, in particular at least 85% by weight.

In another preferred embodiment, the sum of the components a) and b) is at least 80% by weight, in particular at least 85% by weight, wherein the ratio (parts per weight) of the component a) to the component b) is between 5:95 and 70:30, particularly preferably 10:90 to 50:50, in particular 20:80 to 30:70.

In a preferred embodiment of the present invention, the proportion of the component c) (catalyst) is at least 1% by weight, in particular at least 2% by weight.

The quantity of the binder system of the invention applied to the textile fabric is preferably between 5 and 50% by weight of dry binder, in particular 10 and 30% by weight, most preferably 10 and 25% by weight of dry binder after drying referring to the total weight of the raw textile fabric. For applications in the field of filtration products, the applied quantity after drying is preferably between 5 and 25% by weight.

Insofar as the binder system used according to the invention is to be used as an aqueous dispersion or solution, the viscosity is preferably 50 to 20000 mPa*s, in particular 100 to 8000 mPa*s, particularly preferably 900 to 4000 mPa*s (determined according to DIN EN ISO 2555 and at 23° C.).

The binder system used according to the invention can be available as real dispersions, colloidally dispersed or molecularly dispersed dispersions, generally though as so-called partial dispersions, i.e. aqueous systems, which are in part molecularly dispersed and in part colloidally dispersed.

The textile fabric consolidated by means of the binder system according to the invention has, compared to consolidated textile fabrics, which have in component a) a cross-linking agent based on one at least divalent alcohol, an improved color stability, i.e. no or a significantly reduced yellowing of the consolidated textile fabric after the heat treatment (drying resp. consolidation of the binder) is established.

The textile fabric consolidated by means of the binder system according to the invention has a significantly improved wet strength and an excellent mechanical strength compared to consolidated textile fabrics, but is more economically advantageous to manufacture. The same applies to the good heat distortion strength, which, despite the replacement of considerable portions of the component a) by components b), is also maintained.

Beyond that, the binder system of the invention is only slightly hygroscopic so that no restrictions on the use of the consolidated textile fabrics as base interlinings in the manufacture of PVC floorings, for example by blistering, can be observed.

Likewise surprising is the ageing behavior of the consolidated textile fabric, which is almost constant even though a person skilled in the art would expect a worsening of the ageing behavior.

Compared to a textile fabric which only contains starch as binder component c), the textile fabric consolidated according to the invention is improved or at least equivalent with regard to its hygroscopic behavior, the strength, in particular the wet and hot strength, the ageing behavior and the flexibility.

By partly using starch as a replacement, significant cost savings may be realized. In addition, a binder system completely free of formaldehyde is obtained without being obliged to cut back on the product properties. Surprisingly, the product properties are even improved in some areas; for instance, the friability of the textile fabric manufactured according to the invention is significantly reduced compared to that of similar textile fabrics.

Binder Component A) (Polymerisate)

The polymerisates based on carboxylic acid (polycarboxylates) used according to the invention as component a) have no low-molecular cross-linking agent in the sense of the present invention, in particular no cross-linking agent based on a polyvalent, i.e. at least divalent alcohol. Customary polymerisates based on carboxylic acid usually have a cross-linking component based on a polyvalent alcohol, such as triethanolamine (TEA).

Polycarboxylic acids, which may additionally be modified are preferably used as polycarboxylates. The polycarboxylic acids may have unsaturated constituents and/or be used as a mixture with unsaturated monomeric carboxylic acid constituents. The unsaturated monomeric carboxylic acid constituents are preferably compounds capable of forming acrylates or polyacrylates.

Polyacrylates are preferably used as polycarboxylates, wherein polyacrylates are meant to be polymers, i.e. homopolymers, copolymers or terpolymers based on acrylic acid and/or modified acrylic acid, in particular methacrylic acid, monomers, as well as maleic acid/maleic acid anhydride and/or styrene-maleic acid anhydride (SMA).

The polymerisates based on carboxylic acid (polycarboxylates) used according to the invention have free carboxylic acid groups, i.e. the acid groups are covalently bonded to the polymer backbone. The concentration of free carboxylic acid groups is preferably approximately 500 to 1000 mg KOH/g of solid.

The polymerisates based on carboxylic acid (polycarboxylates) used according to the invention have no low-molecular cross-linking agent. Low-molecular cross-linking agents are meant to be di-, tri- or poly-functional group, which react with the carboxylic acid groups of the polymerisate and generate a covalent chemical bond, such as compounds with OH groups, in particular polyols, as well as compounds with amine groups, in particular polyamines, as well as compounds with OH— and amine groups, in particular polyalkanolamines, wherein the term "low-molecular" comprises compounds, the molecular weight of which is <1000 g/mol, preferably <500 g/mol.

The polymerisates based on polycarboxylic acid used according to the invention are commercially available from Archema, for example, under the name ENCOR3875 as an aqueous dispersion or solution.

If the component a) of the binder system of the invention shall be used as an aqueous polymer dispersion, conventional and known emulsifying agents or protective colloids can be added for stabilization. These are known to the person skilled in the art (cf. Houben-Weyl, Methoden der org. Chemie, vol. XIV/1, 1961, Stuttgart). Examples of emulsifying agents are polyglycolethers, fatty alcohol-polyglycolethers, phosphoric esters and their salts, sulfonated paraffin hydrocarbons, higher alkyl sulfates (such as lauryl sulfate), alkali metal salts of fatty acids, such as sodium stearate or sodium oleate, sulfuric acid semi-ester of ethoxylated fatty acid alcohols, salts of esters and semi-esters of alkyl polyoxyethylene sulfosuccinates, salts of sulfonated alkyl aromatics, such as sodium dodecyl benzolsulfonate, ethoxylated C4-C12-alkylphenols and their sulfonation products such as ester of the sulfosuccinic acid. Examples for protective colloids are alkylhydroxyalkyl celluloses, partly or completely hydrolyzed polyvinyl alcohols and copolymers thereof, acrylic acid, homopolymers and copolymers and partly neutralized salts thereof, acrylamide copolymers, polyacrylate copolymers and salts thereof, carboxyalkyl cellulose, such as carboxymethyl cellulose and its salts.

Furthermore, component a) can be available as real dispersions, colloidally dispersed or molecularly dispersed dispersions, generally though as so-called partial dispersions, i.e. aqueous systems, which are in part molecularly dispersed and in part colloidally dispersed.

Insofar as the component a) of the binder system according to the invention is to be used as an aqueous polymer dispersion or polymer solution, the solids content is preferably between 30 and 70% by weight, in particular between 35 and 65% by weight, most preferably 40 to 60% by weight (determined according to DIN EN ISO 3251).

Insofar as the component a) of the binder system according to the invention is to be used as an aqueous polymer dispersion, the viscosity is preferably 50 to 20000 mPa*s, in particular 100 to 8000 mPa*s, most preferably 900 to 4000 mPa*s (determined according to DIN EN ISO 2555 and at 23° C.).

Insofar as the component a) of the binder system according to the invention is to be used as an aqueous polymer dispersion, the pH-value (measured as a 10% by weight solution in water) is between 1 and 5, preferably between 1.5 and 4.0 (determined according to DIN EN ISO 976).

In a preferred embodiment of the invention, the component a) of the binder system according to the invention comprises an additional polyacrylate dispersion based on carboxylic acid and/or modified acrylic acid, in particular methacrylic acid, monomers, as well as maleic acid/maleic acid anhydride and/or styrene-maleic acid anhydride (SMA), which are different from the polycarboxylate with respect to their chemical composition and/or with respect to their physical properties. With regard to the physical properties, they are, however, different, but they are within the already mentioned physical parameters. The amount of additionally used polyacrylate dispersion is up to 10% by weight, at least 1% by weight, and replaces the polycarboxylate to this extent. The total quantity of component a) thus remains in the range of 5 to 70% by weight.

Binder Component B) (Starch)

The starches used according to the invention are not subject to restrictions; however, they must be compatible with component a) and optionally with component c), d) and e).

Suitable starches according to the invention are natural—so-called native—starches and modified starches, such as cationic or anionic starches, or starch derivatives (so-called chemically modified starches). Starches with a sufficient solubility in cold and/or hot medium are generally advantageous.

A group of starches that might be used within the scope of the invention comprises starches extracted from vegetable raw materials. These include among others starches from tubers, such as potatoes, manioc, arrowroot, batata, from seeds, such as wheat, maize, rye, rice, barley, millet, oat, sorghum, from fruits, such as chestnuts, acorns, beans, peas, and other pulses, bananas, as well as from plant marrow, e.g. of the sago palm.

The starches usable within the scope of the invention essentially consist of amylose and amylopectin in changing volume ratios.

The molecular weights of the starches useful according to the invention can vary over a wide range. The starches consisting essentially of a mixture of amylose and amylopectin, preferably have a molecular weight $M_w$ of between $5 \times 10^2$ and $1 \times 10^8$, particularly preferably between $5 \times 10^4$ and $1 \times 10^7$.

Besides starches of native vegetable origin, starches which are chemically modified, have been obtained by fermentation, are of recombinant origin or have been produced by biotransformation (biocatalysis), are also equally preferred.

The term "biotransformation" is interchangeable with the term "biocatalysis".

"Chemically modified starches" means starches whose properties have been chemically modified compared to the natural properties. This is essentially reached by polymer-analogous reactions during which starch is treated with monofunctional, bifunctional or polyfunctional reagents or oxidizing agents. In this process, preferably the hydroxyl groups of the starch are modified by etherification, esterification or selective oxidation; or the modification is based on a radically initiated graft copolymerization of copolymerizable unsaturated monomers on the starch backbone.

Particular chemically modified starches include, among others, starch esters, such as xanthogenates, acetates, phosphates, sulfates, nitrates, starch ethers, such as nonionic, anionic or cationic starch ethers, oxidized starches, such as dialdehyde starch, carboxy starch, persulfate-degraded starches and similar substances.

In the linguistic usage of the invention, "fermentative starches" refers to starches which are extracted in fermentative processes using natural organisms, such as fungi, algae or bacteria, or which may be extracted with the activation and help of fermentative processes. Examples for starches obtained from fermentative processes include among others gum arabic and related polysaccharides (gellan gum, ghatti gum, karaya gum, gum tragacanth), xanthan, emulsan, rhamsan, wellan, schizophyllan, polygalacturonates, laminarin, amylose, amylopectin and pectines.

"Starches of recombinant origin" or "recombinant starches" in the invention refers to starches which are extracted in fermentative processes using organisms not occurring in nature, but with the help of natural organisms that are modified by using genetic methods, such as fungi, algae or bacteria, or which may be extracted with the activation and help of fermentative processes. Examples for starches obtained from fermentative, genetically modified processes include, among others, amylose, amylopectin and polyglucans.

Within the scope of the invention, "starches prepared by biotransformation" means that starches, amylose, amylopectin or polyglucans are produced by a catalytic reaction of monomeric basic components, generally of oligomeric saccharides, in particular of mono- and disaccharides, by using a biocatalyst (also: enzyme) under special conditions. Examples for starches obtained from biocatalytic processes are, among others, polyglucan and modified polyglucans, polyfructan and modified polyfructans.

Furthermore, the invention also comprises derivatives of the starches particularly mentioned. In this context, the terms "derivative of starches" or "starch derivatives" generally refer to modified starches, i.e. such starches in which the natural amylose/amylopectin ratio were modified to change their properties, a pre-gelatinization was carried out, which were subject to a hydrolytic degradation or were chemically derivatized.

Examples of particular derivatives of starches are, among others, oxidized starches, e.g., dialdehyde starch or other oxidation products having carboxyl functions, or native ionic starches (e.g., with phosphate groups) or starches which have been further modified ionically, wherein this term covers both anionic and cationic modifications.

The destructurized starches, which may be used in the context of the invention, comprise those which, for example, were homogenized by means of glycerol such that no more crystalline reflexes occur in the X-ray diffraction and starch grains or double-refracting regions are no longer visible at a thousand-fold magnification in the polarization microscope. In this context, reference is made to DE-A1-3931363 of which the disclosure of destructurized starches is also part of the this description.

The starches used according to the invention are commercially available from Avebe, Cargill, National Starch, Penford Products Co, Purac or Südstärke, for example.

Especially advantageous are starches which have a sufficient solubility in cold and/or hot medium. A sufficient solubility is given if the viscosity of the binder system according to the invention allows a corresponding workability.

Binder Component C) (Catalyst)

The binder system used according to the invention may further contain up to 10% by weight of catalyst. Alkali metal hypophosphite catalysts and alkali metal phosphite catalysts are particularly suitable.

Preferably, the catalyst is an alkaline phosphinate/alkaline earth phosphinate; particularly preferred is Na-phosphinate as the catalyst.

The presence of the catalyst causes a reaction acceleration of the cross-linking between the OH group of the present starch and the present carboxylic acid from the polymerisate and, in addition, a significantly reduced yellowing at the same thermal load during hardening of the binder system.

Binder Component D) (Adhesion Promoter)

The binder system used according to the invention may further contain up to 1% by weight of adhesion promoter. The adhesion promoter promotes the adhesion of the binder on the surface of the fibers of the textile fabric. Different adhesion promoters are used depending on the type of fiber. Insofar as the textile fabric has glass fibers, in particular silanes, in particular organo-functionalized silanes are suitable.

Preferably, the adhesion promoter is silane A187. Such adhesion promoters are distributed, among others, by the company Momentive under the name Silquest A-187.

Binder Component E) (Additives)

The binder system used according to the invention may also contain up to 10% by weight of additives. These are commercially available additives such as preservatives, stabilizers, antioxidants, anti-foaming agents, hydrophobizing agents, UV stabilizers, fillers and/or pigments. They are partly contained in the commercial products and serve to stabilize storage and transport or may be added later in order to meet the customer's specifications.

Textile Fabric

Within the scope of this description, the term "textile fabric" is to be understood in its widest meaning. It may be used for all structures composed of fibers which have been manufactured according to a surface-forming method. The fiber-forming materials are natural fibers, mineral fibers, glass fibers, fibers composed of synthetic products and/or fibers composed of synthesized polymers. For the purposes of the present invention, textile fabrics are in particular understood as being woven fabrics, yarn sheets, knitted fabrics or non-woven fabrics, in particular non-woven fabrics.

Textile fabrics based on mineral fibers and/or glass fibers are in particular non-woven fabrics based on mineral fibers and/or glass fibers. The aforementioned non-woven fabrics based on mineral fibers and/or glass fibers can also be combined with other textile fabrics, in particular non-woven fabrics.

The glass fiber or mineral fiber non-woven fabrics used can be manufactured by means of any known method. Non-woven glass fiber fabrics which have been manufactured by means of the wet-laid method, the dry-laid method or the air-laid method are particularly suitable. In the course of the manufacturing process, in particular the wet-laid method, these non-woven fabrics may contain small proportions of chemical auxiliary substances as a result of the process, for example thickening agents, antifoaming agents, etc. These substances originate from the circulation water in the manufacture of non-woven fabrics.

The mineral fiber non-woven fabrics used according to the invention can be consolidated by means of the binder system according to the invention and additionally by mechanical methods, e.g., needling or hydrodynamic needling. They are most preferably carded non-woven fabrics composed of filaments, i.e. endlessly long fibers, or of staple fibers. The average diameter of the mineral fibers is between 8 and 16 µm, preferably between 10 and 12 µm.

Suitable mineral fibers include aluminosilicate fibers, ceramic fibers, dolomite fibers, or fibers of vulcanite, such as basalt, diabase, melaphyre. Diabases and melaphyres. These are commonly referred to as paleobasalts, wherein diabase is also often called greenstone.

The weight per unit area of the mineral fiber non-woven fabrics used according to the invention is between 20 and 350 g/m$^2$, preferably between 25 and 90 g/m$^2$. The above details do also apply to the glass mats described below.

The glass fiber non-woven fabrics used according to the invention can be consolidated by means of binders or else by mechanical methods, e.g., needling or hydrodynamic needling. The glass fibers may be filaments or finite or cut glass fibers wherein in the latter case, the length of the fibers is between 1 and 40 mm, preferably 4 to 20 mm. The average diameter of the glass fibers is between 6 and 20 µm, preferably between 8 and 15 µm.

Suitable glass fibers include glass types such as E-glass, S-glass, R-glass or C-glass, wherein E-glass or C-glass is preferred for economic reasons.

Among the textile fabrics based on synthetic polymers, non-woven fabrics composed of fibers from synthetic polymers, in particular spunbonded fabrics, so-called spunbonds, which are produced by random deposition of freshly melt-spun filaments, are preferred. They consist of continuous synthetic fibers composed of melt-spinnable polymer materials. Suitable polymer materials include, for example, polyamides, such as e.g. polyhexamethylene diadipamide, polycaprolactam, wholly or partly aromatic polyamides ("aramids"), aliphatic polyamides, such as e.g. nylon, partly or wholly aromatic polyesters, polyphenylene sulfide (PPS), polymers having ether and keto groups, such as e.g. polyether ketones (PEKs) and polyether ether ketone (PEEK), polyolefins, such as e.g. polyethylene or polypropylene, or polybenzimidazoles.

Preferably, the spunbonded fabrics consist of melt-spinnable polyesters. The polyester material can, in principle, be any known type suitable for fiber production. Such polyesters consist predominantly of components derived from aromatic dicarboxylic acids and from aliphatic diols. Commonly used aromatic dicarboxylic acid components are the bivalent radicals of benzenedicarboxylic acids, especially of the terephthalic acid and the isophthalic acid; commonly used diols have 2 to 4 carbon atoms, wherein ethylene glycol is particularly suitable. Spunbonded fabrics which consist of at least 85 mol % of polyethylene terephthalate are particularly advantageous. The remaining 15 mol % are then comprised of dicarboxylic acid units and glycol units which act as so-called modifiers and allow the person skilled in the art to targetedly influence the physical and chemical properties of the produced filaments. Examples of such dicarboxylic acid units are radicals of isophthalic acid or of aliphatic dicarboxylic acid, such as glutaric acid, adipic acid, and sebacic acid; examples of modifying diol radicals are those composed of longer-chain diols, such as propane diol or butane diol, of diethylene or triethylene glycol or, if present in small quantities, of polyglycol with a molar weight of approximately 500 to 2000.

Polyesters containing at least 95 mole % of polyethylene terephthalate (PET) are particularly preferred, especially those composed of unmodified PET.

The individual titers of the polyester filaments in the spunbonded fabric amount to between 1 and 16 dtex, preferably between 2 and 8 dtex.

The weight per unit area of the textile fabric made of fibers of synthetic products, in particular of synthetic polymers, and used according to the invention is between 20 and 500 g/m$^2$, preferably between 40 and 250 g/m$^2$. The preceding information also applies for spunbonded non-woven fabrics, in particular for spunbonded non-woven fabrics based on melt-spinnable synthetic polymers, wherein polyester is particularly preferred.

In a further embodiment of the invention, such textile fabrics have at least one reinforcement, in particular if they are used as base interlinings for roofing sheets. They are preferably designed in such a manner that the reinforcement absorbs a force so that the reference force in the force-elongation diagram (at 20° C.) of the base interlining with reinforcement compared to the base interlining without reinforcement differs within the range between 0 and 1% of elongation in at least one point by at least 10%.

In another embodiment, the reinforcement can be incorporated in such a way that, due to the reinforcement, forces are only absorbed at higher elongations.

For economic reasons, preferred reinforcements consist of glass multifilaments in the form of—essentially—parallel warp sheets or scrims. In most cases, the non-woven fabrics are reinforced in the longitudinal direction by—essentially—parallel warp sheets.

The reinforcing filaments may be used as such or in the form of a discrete textile fabric, for example as a woven fabric, yarn sheet, knitted fabric or non-woven fabric.

Reinforcements with reinforcing yarns running parallel to each other, that is warp sheets, as well as scrims or woven fabrics are preferred.

The measurement of the reference force is carried out in accordance with EN 29073, part 3, on 5 cm wide samples at a restraint length of 200 mm. Here, the numerical value of the pre-stress force, expressed in centinewton, corresponds to the numerical value of the weight per unit area of the sample, expressed in gram per square meter.

The reinforcement may be carried out by the inclusion of the reinforcements in the textile fabric, on at least one face of the textile fabric or else at any location of the base interlining, in particular in other textile fabrics differing from the first textile fabric, or as an individual textile fabric.

For use as a base interlining, the consolidated textile fabric according to the invention may have further textile fabrics in addition to the textile fabric according to the invention described above. Preferably, these further textile fabrics differ from the textile fabric first mentioned, i.e. they are made of a different material.

Insofar as the textile fabric is made up of synthetic polymers, it may be necessary to include further textile fabrics in the base interlining according to the invention in order to optimize the application properties.

It is surprising to the person skilled in the art that the use of the binder system of the invention can improve the properties of the textile fabric. In particular, improvements of the brittleness of the textile fabric result from the use of the binder system according to the invention.

The textile fabric consolidated according to the invention can be used as a base interlining itself or in combination with further textile fabrics as a base interlining for coated sarking membranes, roofing sheets and water-proof sheetings as well as a textile backing or a textile reinforcement in floorings, in particular carpets and PVC floorings, or in facer, wall coating inside and outside of buildings as well as in furniture since, compared to the products that are known to date, they do not suffer from yellowing, in particular during thermal hardening of the binder system, and are thus particularly well suited as decorative surfaces. Apart from that, the textile fabric consolidated according to the invention may also be used in flooring applications and in the field of filtration.

Coating Compounds

Polyethylene or polyvinyl chloride, polyurethanes, EPDM or TPO (polyolefins) are used as coating compounds for floorings or carpet backings. Besides that, bitumen is used for the coated sarking membranes, roofing sheets and water-proof sheetings.

The bituminized sheets contain at least one—above-described—lining sheet which is embedded in a bitumen matrix, wherein the percentage by weight of the bitumen related to the weight per unit area of the bituminized roofing sheet is preferably 60 to 97% by weight and that of the spunbonded fabric 3 to 40% by weight.

Manufacturing

The manufacture of the textile fabrics used according to the invention is carried out by means of known methods and processes. The manufacture of the consolidated textile fabric according to the invention is carried out by means of the following measures:

A) formation of a textile fabric and optionally mechanical consolidation thereof,
B) application of the binder system according to the invention, comprising:
   I) impregnation of the textile fabric by means of known methods, such as by means of a curtain coater, or by immersion in a binder bath,
   II) removal of excess binder, for instance by means of sucking off or mechanically by rolling,
C) drying and consolidation of the binder.

The applied quantities and other nature of the binder system was already described in detail at the beginning and is also valid for the method.

The formation of the textile fabric is carried out by means of known methods.

The implementation of the mechanical consolidation optionally carried out also takes place by means of known methods.

The inclusion of the optionally present reinforcement is carried out during or after the formation of the textile fabric or before or during the application of the binder system according to the invention. The supply of the reinforcement and optionally any further heat treatment in the manufacturing process preferably takes place under stress, in particular longitudinal stress.

The supply of further textile fabrics optionally to be included takes place before or during the consolidation of the binder system according to the invention.

The application of the binder system in step B) is also carried out by means of known methods. The applied layer of binder (after drying) is preferably between 5 and 50% per weight, in particular 10 and 40% by weight, most preferably 15 and 30% by weight dry binder referring to the total weight of the untreated textile fabric.

Drying or consolidation of the binder is also carried out by means of methods known to the person skilled in the art, wherein temperatures of at least 140° C. to 250° C. prove to be advantageous. The drying resp. thermal treatment causes among others a chemical reaction (esterification) between the polycarboxylate and the starch with formation of the corresponding condensates.

If the formation of the textile fabric is carried out by means of so-called wet laid methods, e.g. for glass fiber non-woven fabrics, the binder system according to the invention can also be added to the process water (White Water), which is used for the manufacture of the textile fabric.

The individual procedure measures are known per se, but patentable in the combination or order according to the invention and with the use of the binder system according to the invention.

Measurement Methods:
General Measurement Methods:
To such extent not already specified, the following methods are applied:
Air Permeability: The air permeability is determined in accordance with DIN EN ISO 9237 (1995-12).
Weight per Unit Area:
The weight per unit: The weight per unit area is determined in accordance with DIN EN ISO 29073-1 (1992-08).
Measurement of the Fiber Diameter:
The fiber diameter is determined in accordance with DIN EN ISO 1973 (As of: 1995-12).
Measurement of the Reference Force:
The reference force is measured according to DIN 29073, Part 3 (1992-08) on 5 cm wide samples at a restraint length of 200 mm. Here, the numerical value of the pre-stress force, expressed in centinewton, corresponds to the numerical value of the weight per unit area of the sample, expressed in gram per square meter.
Measurement of the Hot Strength:
The hot strength is a measure of the longitudinal strength of the non-woven fabric at 200° C. The resistance is determined in accordance with DIN EN 29 073-3 (1992-08), wherein the measurement is carried out at 200° C. in a furnace.
Viscosity: The viscosity is determined in accordance with DIN EN ISO 2555 (Brookfield). The test has the following citation (German Edition EN ISO 2555:1999: publication date (2000-01).
Free Acid content: The concentration of free carboxy acid groups is determined by acid/base titration using potentiometric methods.
Solid content: The solid content (Circulating air oven) is determined in accordance with DIN EN ISO 3251. The test has the following citation (German Edition EN ISO 3251:2008: publication date (2008-06).
pH Value. The pH value is determined in accordance with DIN EN ISO 976. The test has the following citation: DIN EN ISO 976/2008-07

What is claimed is:

1. A binder system, comprising:
polymerisates based on carboxylic acid, which have no low-molecular cross-linking agent, wherein an amount of polymerisates based on carboxylic acid is in a range from 30 to 70% by weight,
a starch or a mixture of a plurality of starches, wherein the starch or the mixture of a plurality of starches are not the same as the polymerisates based on carboxylic acid and an amount of the starch or the mixture of the plurality of starches is in a range from 30 to 95% by weight,
a catalyst, wherein an amount of the catalyst is up to 10% by weight,
an adhesion promoter, wherein an amount of the adhesion promoter is up to 1% by weight, and
additives, wherein an amount of the additives is up to 10% by weight,
wherein the specified percentages by weight refer to the dry mass of the binder system, i.e., without water and the percentages by weight sum to 100% by weight.

2. The binder system according to claim 1, wherein the amount of polymerisates based on carboxylic acid is at least 15% by weight.

3. The binder system according to claim 1, wherein the amount of the starch or the mixture of the plurality of starches is at least 50% by weight.

4. The binder system according to claim 1, wherein the sum of the amount of polymerisates based on carboxylic acid and the amount of the starch or the mixture of the plurality of starches is at least 85% by weight.

5. The binder system according to claim 4, wherein the ratio (parts per weight) of the polymerisates based on carboxylic acid and the starch or the mixture of the plurality of starches is between 20:80 to 30:70.

6. The binder system according to claim 1, wherein the amount of the catalyst is at least 2% by weight.

7. The binder system according to claim 1, characterized in that the binder system is an aqueous dispersion or solution and the viscosity is 900 to 4000 mPa*s (determined according to DIN EN ISO 2555 and at 23° C.).

8. The binder system according to claim 1, characterized in that the polymerisates based on carboxylic acids still have unsaturated constituents and/or are available as a mixture with unsaturated monomeric carboxylic acid constituents.

9. The binder system according to claim 8, characterized in that the unsaturated monomeric carboxylic acid constituents are compounds capable of forming acrylates or polyacrylates.

10. The binder system according to claim 1, characterized in that the polymerisates based on carboxylic acids are polyacrylates based on acrylic acid, modified acrylic acid, maleic acid/maleic acid anhydride, styrene-maleic acid anhydride (SMA), or a combination thereof.

11. The binder system according to claim 1, characterized in that the polymerisates based on carboxylic acid have free carboxylic acid groups, the acid groups are bound covalently to the polymer backbone and the concentration of free carboxylic acid groups is 500 to 1000 mg KOH/g of solid.

12. The binder system according to claim 1, wherein the polymerisates based on carboxylic acid comprise an additional polyacrylate dispersion based on carboxylic acid, modified acrylic acid, maleic acid/maleic acid anhydride, styrene-maleic acid anhydride (SMA), or a combination thereof,
wherein the additional polyacrylate dispersion is different from the polymerisates based on carboxylic acid with respect to its chemical composition and/or with respect to its physical properties, and the quantity of the additional polyacrylate dispersion is in a range of 1% to 10% by weight.

13. The binder system according to claim 1, characterized in that the binder system contains 0.1 to 10% by weight of catalyst, wherein the catalyst is based on alkaline phosphinate/alkaline earth phosphinate, alkali metal hypophosphites, alkali metal phosphites, or a combination thereof.

14. The binder system according to claim 1, characterized in that the binder system is an aqueous polymer dispersion or polymer solution and the solids content is between 40 to 60% by weight (determined according to DIN EN ISO 3251).

15. Use of the binder system according to claim 1 for the consolidation of textile fabrics, wherein an applied quantity is between 10 and 25% by weight of binder, after drying and with reference to the total weight of the textile fabric used.

16. A textile fabric which has been consolidated with the binder system according to claim 1, wherein the applied quantity of the binder system is between 10 and 25% by weight of binder, after drying and with reference to the total weight of the textile fabric used.

17. The textile fabric according to claim 16, characterized in that it is a textile fabric based on mineral fibers and/or glass fibers, the weight per unit area of which is between 25 and 90 $g/m^2$.

18. The textile fabric according to claim 16, characterized in that it is a textile fabric based on spunbonded non-woven fabrics, the weight per unit area of which is between 40 and 250 $g/m^2$.

19. Use of the textile fabric according to claim 16 as a base interlining, optionally in combination with at least one further textile fabric, for coated sarking membranes, roofing sheets and water-proof sheetings, as a textile backing or a textile reinforcement in floorings or in facer, wall coating inside and outside of buildings as well as in furniture.

20. The binder system according to claim 1, wherein the starch or mixture of a plurality of starches consists essentially of natural starch, wherein the nature starch consists essentially of amylose and amylopectin.

* * * * *